United States Patent [19]
Onodera et al.

[11] Patent Number: 5,158,591
[45] Date of Patent: Oct. 27, 1992

[54] OPTICAL FIBER RIBBON FUSION-SPLICING DEVICE

[75] Inventors: Tsutomu Onodera; Takeshi Yamada, both of Sakura; Hiroyuki Taya, Chiba, all of Japan

[73] Assignee: Fujikura Ltd., Tokyo, Japan

[21] Appl. No.: 595,265

[22] Filed: Oct. 9, 1990

[30] Foreign Application Priority Data

Oct. 13, 1989 [JP] Japan .................. 1-267683

[51] Int. Cl.$^5$ .................. C03B 23/20
[52] U.S. Cl. .................. 65/152; 65/158
[58] Field of Search .................. 356/399, 73.1; 65/152, 65/158, 4.2, 4.21, 4.3, 12, 13, 323

[56] References Cited

U.S. PATENT DOCUMENTS

| 4,715,876 | 12/1987 | Osaka | 65/4.21 |
| 4,878,933 | 11/1989 | Yamada | 64/4.2 |
| 4,908,677 | 3/1990 | Onodera et al. | 356/73.1 |
| 4,948,412 | 8/1990 | Yamada | 65/4.21 |

FOREIGN PATENT DOCUMENTS 0321947 6/1989 European Pat. Off. .
62-189409 8/1987 Japan .

OTHER PUBLICATIONS

Transactions of the Institute of Electronics, Information vol. E72, No. 9, Sep. 1989, Tokyo, Japan, pp. 970-978, Fully Automatic and High-Speed Splicing Machine for Optical Fiber Ribbons.

*Primary Examiner*—Joye L. Woodard
*Attorney, Agent, or Firm*—Frishauf, Holtz, Goodman & Woodward

[57] ABSTRACT

In an optical fiber ribbon fusion-splicing device, a TV camera is set such that the horizontal direction of an image sensor contained in the TV camera in which direction a horizontal scanning is carried out and the resolution of the image sensor is higher than that in the vertical direction in which a vertical scanning is carried out is a direction perpendicular to the coaxial direction of a pair of grooved supporting members for supporting fibers of a pair of optical fiber ribbons to be fusion-spliced. Thus, when the fibers of the pair of optical fiber ribbons are set on the supporting members in the coaxial direction thereof, the horizontal direction of the image sensor is perpendicular to the coaxial direction of the fibers of the optical fiber ribbon. Since, therefore, misalignment of the fibers is involved in the high resolution direction, the misalignment can be detected with high precision, without decreasing the power factor of the image sensor.

4 Claims, 7 Drawing Sheets

OPTICAL FIBER RIBBON FUSION-SPLICING DEVICE

BACKGROUND OF THE INVENTION

1. Field of the Invention

The present invention relates to an optical fiber ribbon fusion-splicing device and, more particularly, to an improvement in the resolution of an image of fibers of an optical fiber ribbon.

2. Description of the Related Art

A method of fusion-splicing optical fiber ribbons is known which comprises, as shown in FIG. 1, steps performed prior to a fusion-splicing step, of placing exposed portions $12_1$ and $12_2$ of the fibers of a pair of optical fiber ribbons $10_1$ and $10_2$ on a pair of grooved supporting members $11_1$ and $11_2$, respectively, so that the exposed fibers $12_1$ and $12_2$ are arranged in the coaxial direction of the supporting members $11_1$ and $11_2$, of clamping the fiber ribbons $10_1$ and $10_2$ with a pair of clamps $13_1$ and $13_2$, respectively, of moving the clamps towards each other so that the joining ends of the fibers $12_1$ and $12_2$ close to each other, and of monitoring the alignment of the joining portions of the fibers. For monitoring the fiber alignment, a TV camera 16 is incorporated in the device to pick up via an optical system 26 including an objective lens 14 a light beam having passed through the fibers $12_1$ and $12_2$ to form images of the joining portions of the fibers. The images $12_1'$ and $12_2'$ are displayed on the screen 20 of a TV monitor 18. The joining portions of the fibers $12_1$ and $12_2$ are monitored to determine whether they are aligned or not. If misalignment exists, an alarm-sound is given or an alarm-sign is displayed on the screen. Then, the fiber ribbons $10_1$ and $10_2$ are removed from the clamps $13_1$ and $13_2$, and the above setting operation is repeated. When the misalignment is within a permissible range, the clamps $13_1$ and $13_2$ are further advanced toward each other to further advance the fibers $12_1$ and $12_2$ towards each other with their joining ends being pressed and fusion-spliced to each other by means of an arc generated by applying a high voltage across a pair of electrodes $22_1$ and $22_2$. A reflecting mirror 24 is provided behind the fibers $12_1$ and $12_2$.

The monitoring will be carried out to determine the fiber alignment before and after the fusion-splicing procedure.

In order that an image of the entire of the joining portions of the fibers is provided in a form of a single frame, the entire of the joining portions has to be fallen within a field of view of the TV camera 16 or an image sensor 17.

Meanwhile, the number of fibers of an optical fiber ribbon has been increased to enhance the packing density, and 12-fiber optical fiber ribbon is now introduced for practical use. Also in aligning such optical fiber ribbons having an increased number of fibers, the entire of the joining portions of the fibers should be picked up within the view field of a TV camera in order to provide an image of the entire of the joining portions of the fibers in a form of a single frame. In order to pick up the entire joining portions, in a prior art method, the power factor of the TV camera is lowered to expand the view field of the camera. As the result, the resolution of the image on the screen is decreased and the fiber misalignment will be detected with less accuracy.

In a prior art method, the joining portions of fibers of an optical fiber ribbon having less than 8-fibers can be displayed at high resolution on a monitor screen, and the alignment can be determined with an accuracy of less than 1.0 μm, even when the power factor of the TV camera is reduced so that the entire joining portions can be exhibited within a view field of the TV camera.

However, when it is required that the entire joining portions of the fibers of 12-fiber optical fiber ribbon be taken into the view field, the power factor is greatly lowered, and the resolution of the fiber image displayed on the monitor screen will be decreased, thus resulting in less accurate monitoring.

In the prior art device, the TV camera 16 is set such that the horizontal direction (H-direction in FIGS. 1 and 2) of the image sensor 17 in which direction a horizontal scanning is carried out and the resolution of the image sensor is higher than that in the vertical direction (V-direction in FIGS. 1 and 2) in which a vertical scanning is carried out corresponds to or coincides with the coaxial direction (X-direction in FIGS. 1 and 2) of the grooved supporting members $11_1$ and $11_2$, so that, when fibers $12_1$ and $12_2$ of a pair of optical fiber ribbons $10_1$ and $10_2$ are set on the supporting members in the coaxial direction thereof, the horizontal direction of the image sensor corresponds to or coincides with the coaxial direction (X-direction in FIGS. 1 and 2) of the fibers of the optical fiber ribbons. In misalignment, the fibers $12_1$ and $12_2$ are displaced from each other in the direction (Y-direction in FIGS. 1 and 2) perpendicular to the coaxial direction (X-direction in FIGS. 1 and 2) of the fibers, and thus the displacement is seen in the vertical direction (V-direction) on the image sensor. In order to enhance the accuracy in detection of misalignment, we may increase the V-directional resolution of the image sensor, thereby to provide the image of the joining portions of the fibers with high resolution. However, in fact, even when the V-directional resolution of the image sensor is increased, the resolution of the image of fibers displayed on the TV screen cannot be enhanced, since video signals for TV image reproduction are designated in the standard specification, thus limiting the V-directional resolution of the TV monitor.

The problem associated with the prior art is that a the number of fibers of an optical fiber ribbon is increased, the resolution of the video image of the fibers displayed on a screen is decreased, thus lowering accuracy in detection of misalignment.

SUMMARY OF THE INVENTION

An object of the present invention is to provide an improved optical fiber ribbon fusion-splicing device capable of fusion-splicing a pair of optical fiber ribbons without decreasing the resolution of an image of the fibers of the optical fiber ribbon, even when the number of fibers of the optical fiber ribbon is increased, so that fiber misalignment can be detected with high accuracy.

In an optical fiber ribbon fusion-splicing device according to the present invention, as shown in FIGS. 3 and 4, a TV camera 16 is set such that the horizontal direction (H-direction in FIGS. 3 and 4) of an image sensor 17 contained in the TV camera in which direction a horizontal scanning is carried out and the resolution of the image sensor is higher than that in the vertical direction (V-direction in FIGS. 3 and 4) in which a vertical scanning is carried out corresponds to or coincides with a direction (Y-direction in FIGS. 3 and 4) perpendicular to the coaxial direction (X-direction in FIGS. 3 and 4) of a pair of grooved supporting members $11_1$ and $11_2$ for supporting fibers $12_1$ and $12_2$ of a pair of optical fiber ribbons $10_1$ and $10_2$ to be fusion-spliced, so that, when the fibers of the pair of optical fiber ribbons are set on the supporting members in the coaxial direction thereof, the horizontal direction of the image sensor corresponds to or coincides with the direction perpendicular to the coaxial direction of the fibers of the optical fiber ribbon. Since, therefore, misalignment of the fibers is involved in the high resolution direction, the misalignment can be detected with high precision, without decreasing the power factor of the image sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A preferred embodiment of the present invention will be described in the form of an optical fiber ribbon fusion-splicing device, referring to the accompanying drawings.

Figure 1:
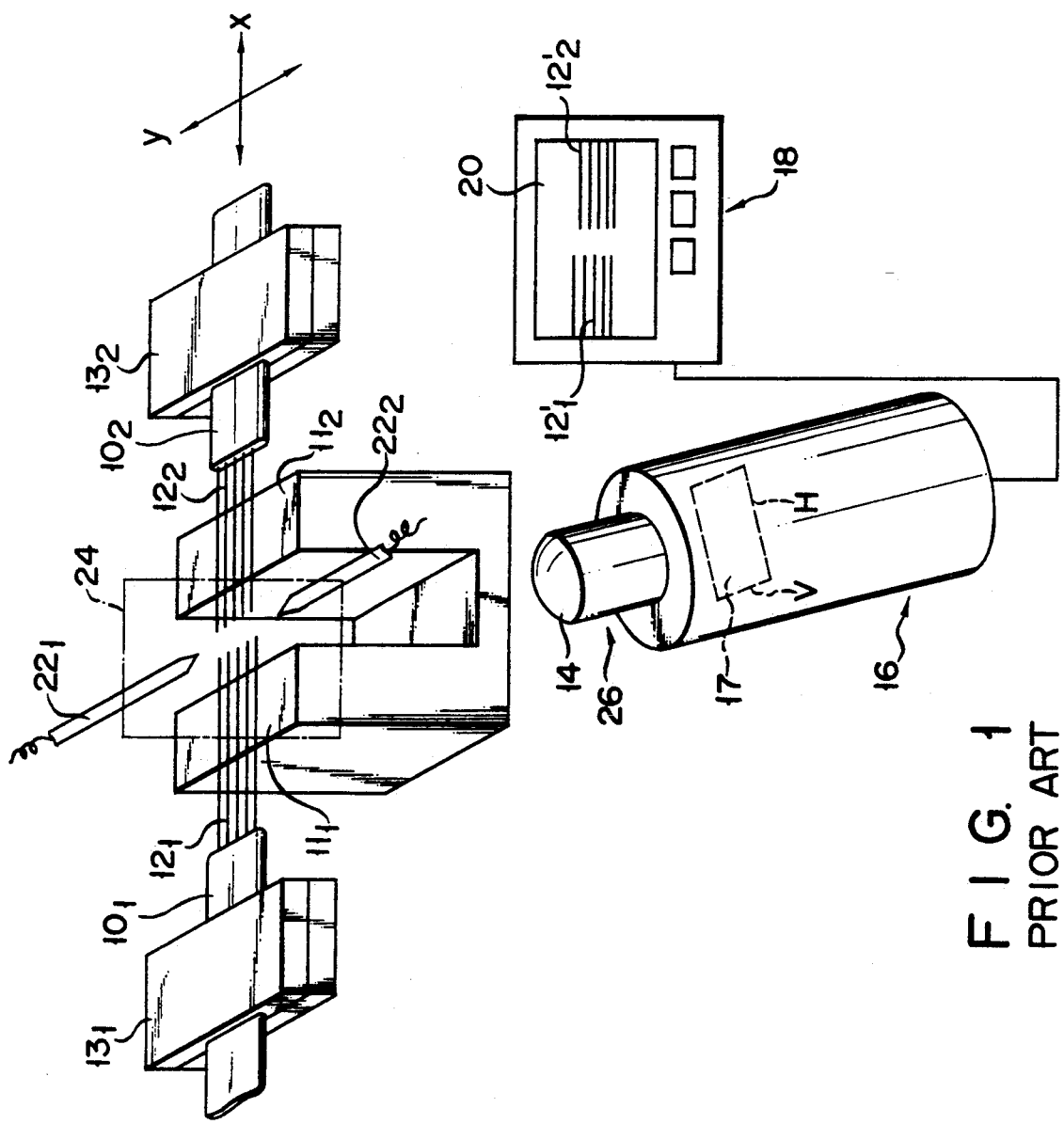
FIG. 1 is a view showing a prior art device of fusion-splicing a pair of optical fiber ribbons to each other.
Figure 2:
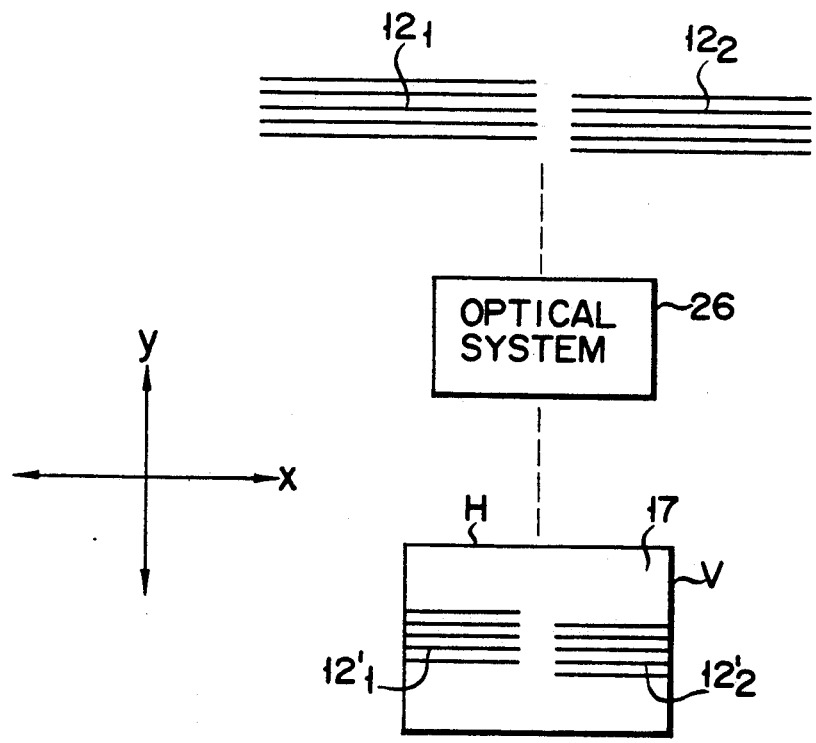
FIG. 2 is a view showing the arrangement of the fibers of the optical fiber ribbons loaded on the prior art device illustrated in FIG. 1 in relation to an image sensor.
Figure 3:
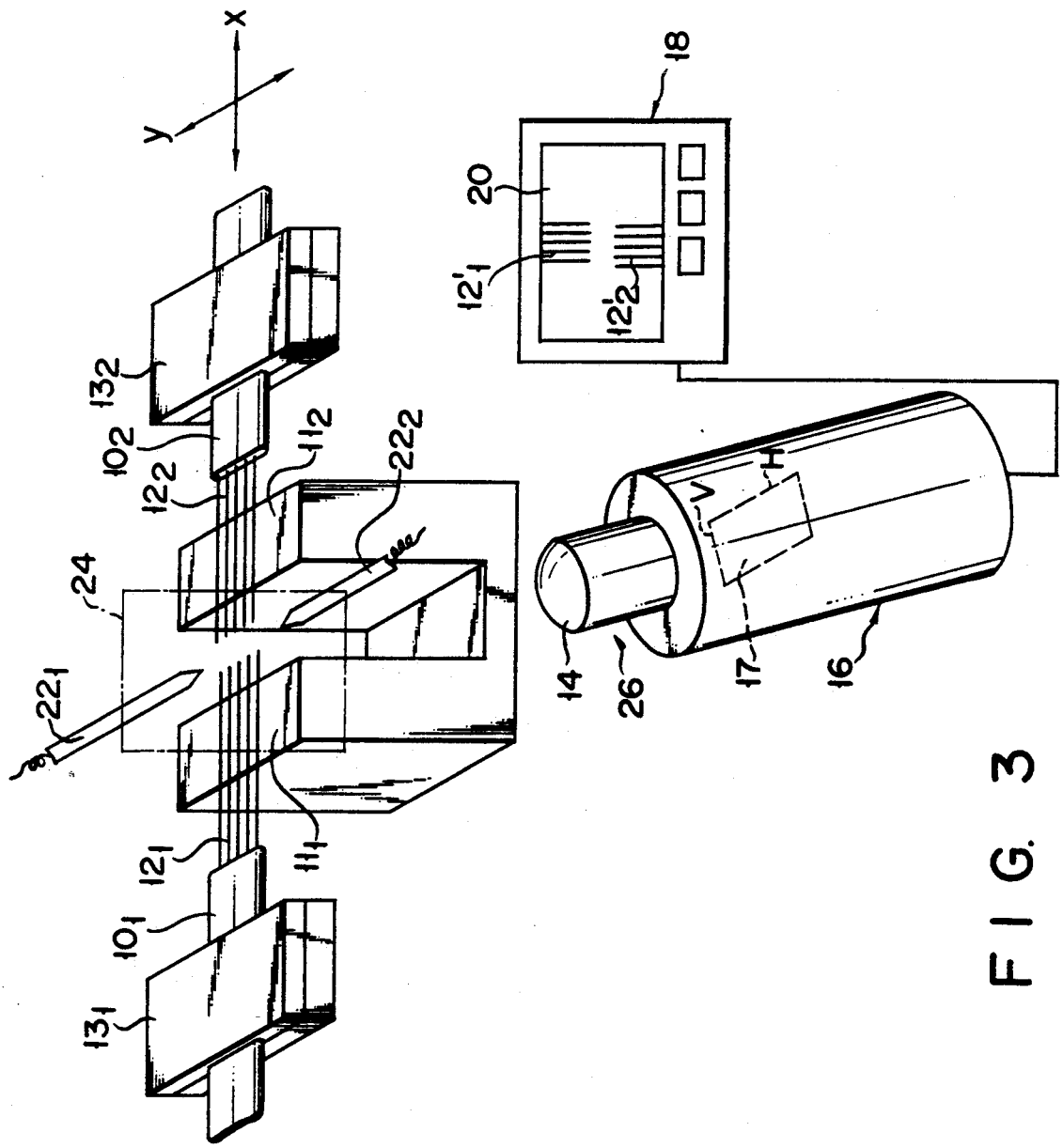
FIG. 3 is a view of an optical fiber ribbon fusion splicing device showing a embodiment of the present invention.
Figure 4:
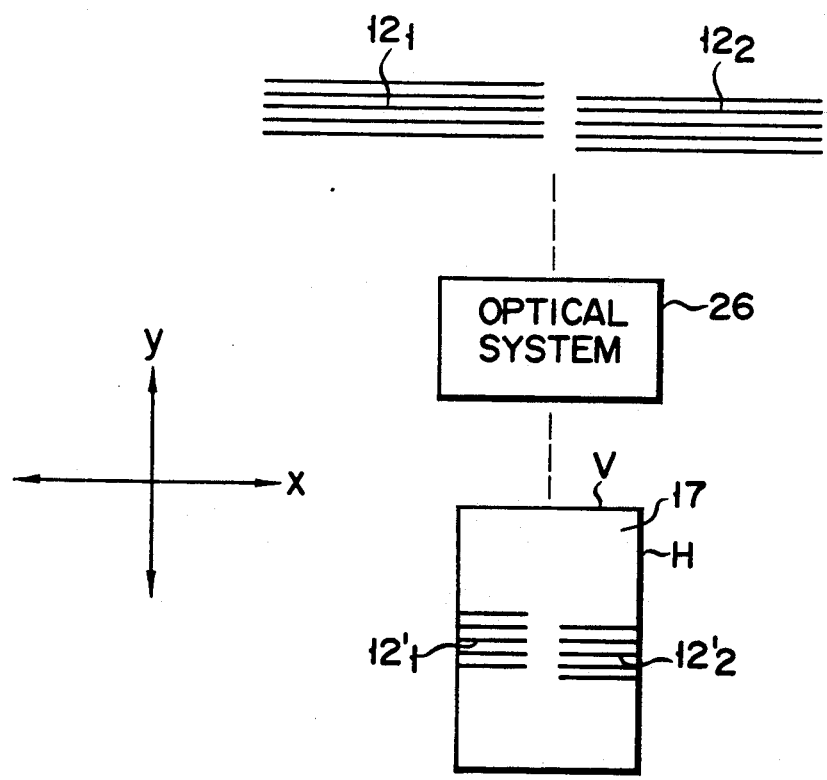
FIG. 4 is a view showing the arrangement of the fibers of the optical fiber ribbon set on the fusion splicing device shown in FIG. 3 in relation to the image sensor.

In the optical fiber ribbon fusion-splicing device T shown in FIG. 3, exposed portions $12_1$ and $12_2$ of the optical fibers of a pair of optical fiber ribbons $10_1$ and $10_2$ are placed on a pair of grooved supporting members $11_1$ and $11_2$, respectively, with joining portions of the fibers projected from the supporting members. The grooves are formed, through not shown for simplicity of illustration, on the top of the supporting members, and extend in the coaxial direction (X-direction) of the supporting members. The fibers are placed in the grooves. The pair of fiber ribbons $10_1$ and $10_2$ are clamped by a pair of clamps $13_1$ and $13_2$, respectively. A TV camera 16 having an image sensor 17 is directed such that the image sensor 17 can pick up a light beam from the fibers through an optical system 26 including an objective lens 14 mounted on the top of the TV camera. The TV camera 16 is also arranged such that the direction (H-direction in FIGS. 3 and 4) of the image sensor in which direction a horizontal scanning is carried out and the resolution of the image sensor is higher than that in the vertical direction (V-direction in FIGS. 3 and 4) in which a vertical scanning is carried out is perpendicular to the coaxial direction (X-direction in FIGS. 3 and 4) of the grooved supporting members $11_1$ and $11_2$. The TV camera 16 is connected to a TV monitor 18 which has a monitor screen 20.

Also, a pair of electrodes $22_1$ and $22_2$ for arc discharge are provided adjacent to the grooved supporting members $11_1$ and $11_2$.

In joining the fibers $12_1$ and $12_2$ of the fiber ribbons $10_1$ and $10_2$ by the fusion-splicing device shown in FIG. 3, the exposed fiber portions $12_1$ and $12_2$ of the pair of fiber ribbons $10_1$ and $10_2$ are first placed on the pair of grooved supporting members $11_1$ and $11_2$, respectively, so that the fibers are arranged in the coaxial direction of the grooved supporting members $11_1$ and $11_2$ to bring the joining ends of the fibers face each other. Thereafter, the pair of fiber ribbons $10_1$ and $10_2$ are clamped by the pair of clamps $13_1$ and $13_2$, respectively. The clamps $13_1$ and $13_2$ are then moved towards each other to bring the joining ends of the fibers close to each other. Then, the alignment of the fibers is checked by monitoring alignment of the joining portions. To determine the alignment of the fibers, images of the joining portions are taken through an optical system 26 including an objective lens 14 by the TV camera 16, and the images $12_1'$ and $12_2'$ are displayed on the monitor screen 20 of the TV monitor 18.

More specifically, a light beam having passed through the joining portions is transmitted via the optical system 26 including the objective lens 14 to the image sensor 17 and picked up by the image sensor, which in turn develops a video image corresponding to the light beam. Since the TV camera 16 is arranged such that the horizontal direction (the H-direction) of the image sensor 17 in which direction a horizontal scanning is carried out and the resolution of the image sensor is higher than that in the vertical direction in which a vertical scanning is carried out corresponds to or coincides with the direction in which misalignment of the fibers may occur, the misalignment of the fibers is involved in the high resolution direction (H-direction).

The video image formed by the TV camera 16 is transmitted to the TV monitor 18 and displayed on the monitor screen 20, as shown in FIG. 3.

Figure 5:
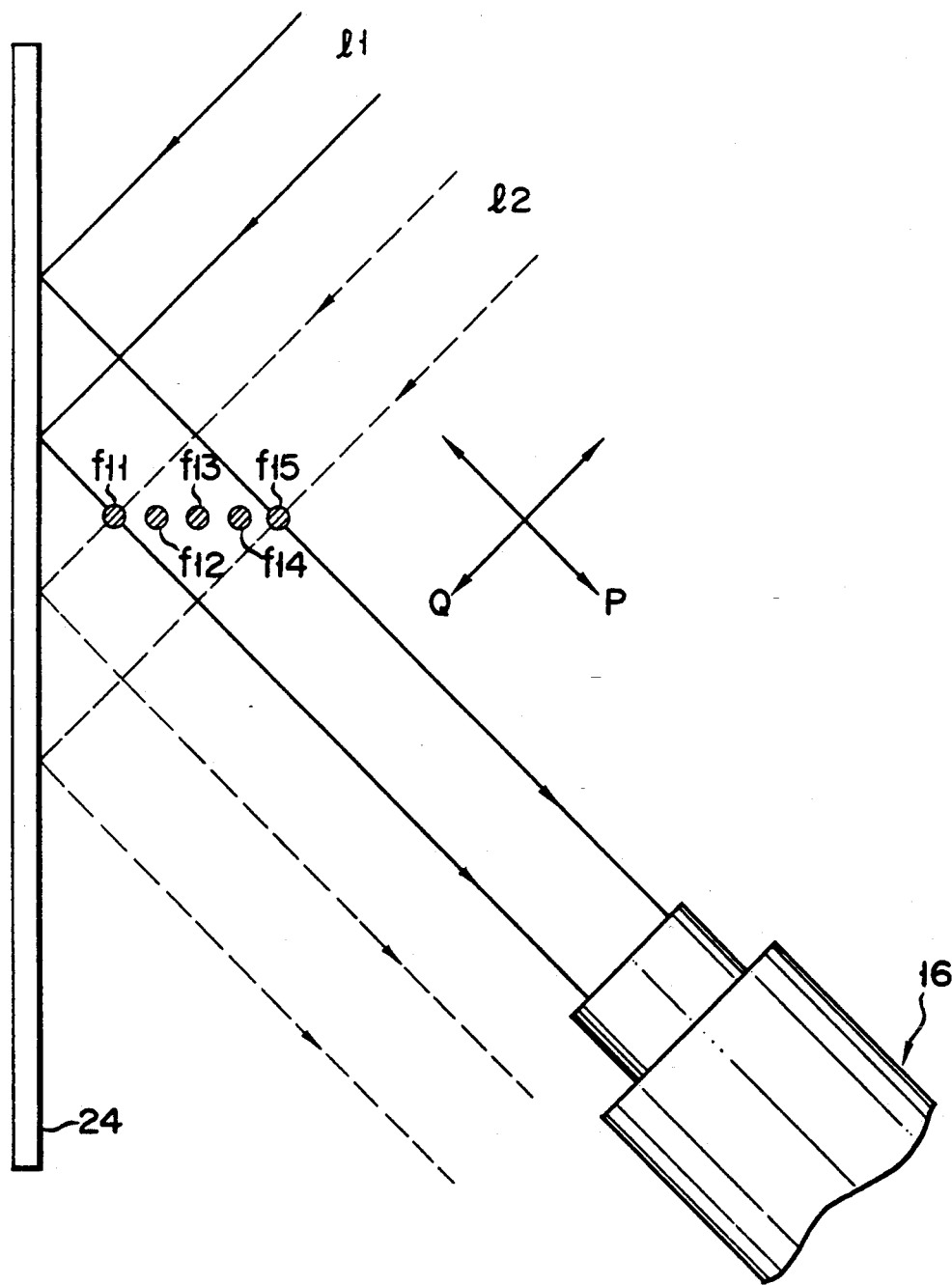
FIG. 5 is a view showing the positional arrangement of the reflecting mirror, the fibers of the fiber ribbon, and the TV camera, in the fusion-splicing device shown in FIG. 4.

As shown in FIG. 5, a parallel light beam 11 emitted by a light source (not shown) is reflected by the reflecting mirror 24 to direct in a P direction, passed through the respective fibers $f_{11}$–$f_{15}$ of fiber ribbon $10_1$ and the respective fibers $f_{21}$–$f_{25}$ of fiber ribbon $10_2$ (not shown in FIG. 5) in the P direction, and picked up by the TV camera 16 to form an image of the fibers $f_{11}$-$f_{15}$ and $f_{21}$-$f_{25}$ in the P direction. In FIG. 5, fibers of the fiber ribbons $10_1$ and $10_2$ are denoted by reference characters $f_{11}$-$f_{15}$ and $f_{21}$-$f_{25}$. Another parallel beam 12 emitted by the light beam (not shown) is passed through the fibers $f_{11}$-$f_{15}$ and $f_{21}$-$f_{25}$ in a Q direction, and reflected by the reflecting mirror 24 to direct in the P direction, and picked up by the TV camera 16 to form an image of the fibers $f_{11}$-$f_{15}$ and $f_{21}$-$f_{25}$ in the Q direction. The camera 17 is moved in the Q direction to pick up one of the light beams 11 and 12 so that the image of the fibers $f_{11}$-$f_{15}$ and $f_{21}$-$f_{21}$-$f_{25}$ in the P direction or the Q direction is displayed on the monitor screen 20.

Figure 6:
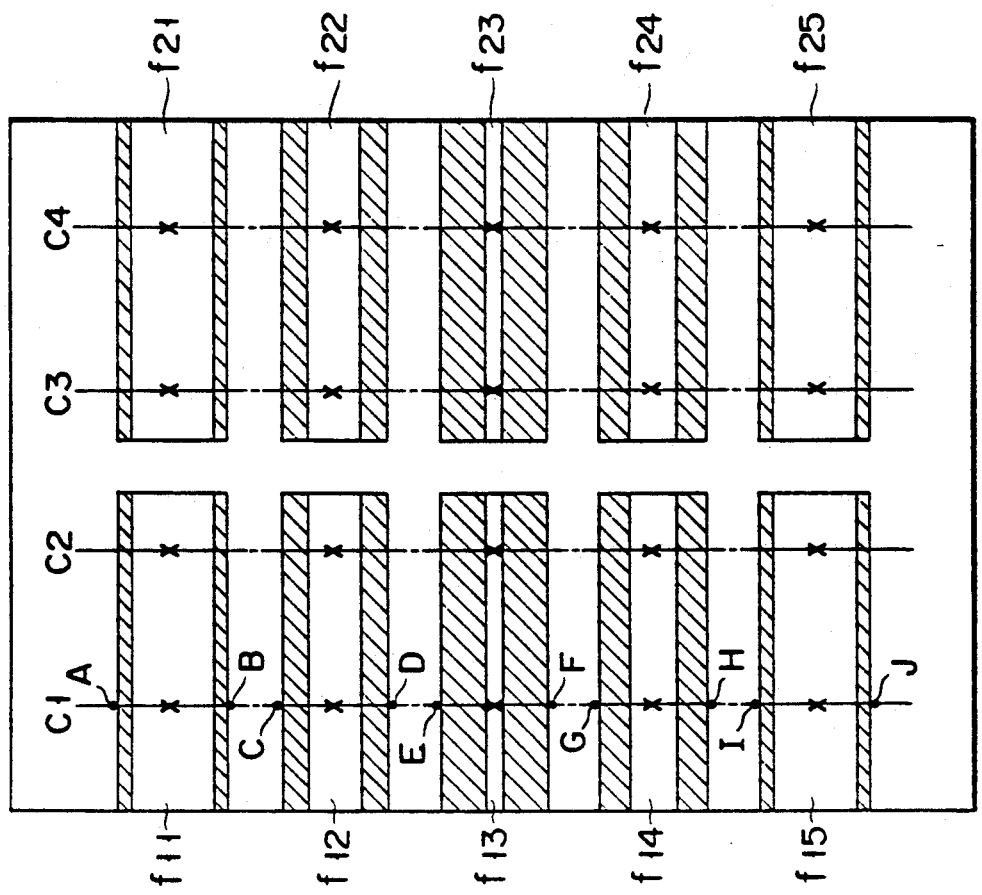
FIG. 6 is a view showing an image of the fibers of the fiber ribbons.

FIG. 6 shows an image of the fibers of the fiber ribbons, in which the fibers of the fiber ribbons $10_1$ and $10_2$ are denoted by reference characters $f_{11}$-$f_{15}$ and $f_{21}$-$f_{25}$.

Figure 7:
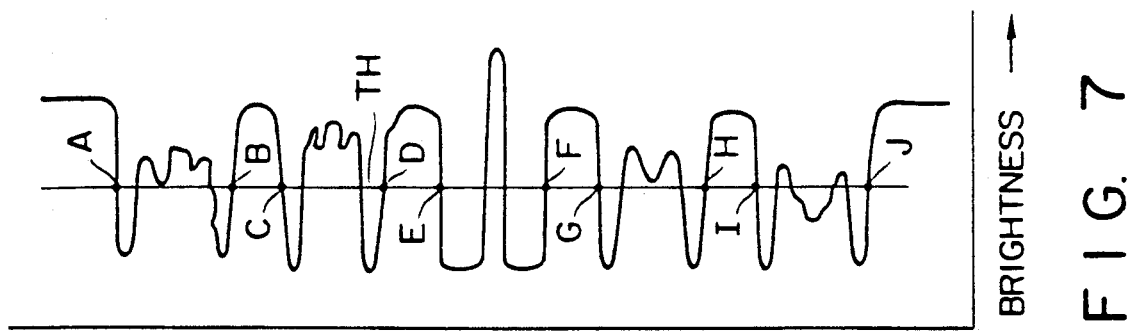
FIG. 7 is a view showing a brightness distribution characteristic curve which is taken along cursor Cl on the image shown in FIG. 6.

The image signal from the TV camera 16 is A/D-converted on cursor $C_1$ shown in FIG. 6, so that, as shown in FIG. 7, the brightness distribution curve of, for example, the P direction images $f_{11}$-$f_{15}$ of the fibers $f_{11}$-$f_{15}$ on the cursor $C_1$ is provided. Points A, B, C, ... I, J of the brightness curve crossing threshold brightness TH shown by a solid line in FIG. 7 correspond to the ends A, B, C, ... I, J of the diameters of the fibers $f_{11}$-$f_{15}$ in FIG. 6. Therefore, the ends A, B, C, ... I, J of the diameters of the fibers are obtained from the brightness curve. The centers of the diameters of the fibers correspond to the centers of the pairs of A and B, C and D, E and F, G and H, and I and J. Therefore, the centers of the diameters of the fibers can be obtained from portions A, B, C, ... I, J on cursor $C_1$. A, B, C, ... I and J on the brightness distribution can be selected from the plural crossing points of the brightness distribution, because the intervals of crossing points A and B, C and D, E and F, G and H, and I and J correspond to the diameters of the fibers $f_{11}$-$f_{15}$.

Similarly, the brightness distribution of images $f_{11}$-$f_{15}$ on cursor $C_2$ and those of images $f_{21}$-$f_{25}$ on cursors $C_3$ and $C_4$ are obtained. The ends of the diameters of the fibers $f_{11}$-$f_{15}$ on cursor $C_2$ and the ends of the diameters of the fibers $f_{21}$-$f_{25}$ on cursors $C_3$ and $C_4$ are obtained from these brightness distributions. The centers of the diameters of the fibers can be obtained from the diameter ends.

Basing on data of the diameter centers of the fibers $f_{11}$-$f_{15}$ thus obtained on the cursors $C_1$ and $C_2$ and data of the diameter centers of fibers $f_{21}$-$f_{25}$ also obtained on cursors $C_3$ and $C_4$, center lines of the fibers $f_{11}$-$f_{15}$ and $f_{21}$-$f_{25}$ are determined and it is obtained how the center line of one of the paired fibers opposed to each other is shifted from that of the other. In this way, their center shifts in the P direction $\Delta P_1$-$\Delta P_5$ are obtained.

The same operation for center shifts is conducted to the Q direction images (not shown) to obtain center shifts $\Delta Q_1$-$\Delta Q_5$ in the Q direction. A resultant center shifts or misalignment $\Delta R_1$-$\Delta R_5$ of the fibers opposed to each other are calculated by $\Delta R_i = \sqrt{\Delta Pi^2 + \Delta Q1^2}$ ($i=1$ to 5). The resultant center shifts are then compared with a reference permissible value.

If the degree of the misalignment is greater than the permissible value, an alarm-sound is emitted and an alarm-sign is displayed on the TV screen. The operator is then required for opening the clamps $13_1$ and $13_2$ and repeating the same setting operation. When the misalignment falls within the permissible level, a voltage is applied across the electrodes $22_1$ and $22_2$ for generating an arc. The joining ends of the fibers of the fiber ribbons are fused by the arc, while the clamps are moved in the X-directions so that the joining ends close each other, and finally are pushed against each other. As the result, the fibers $12_1$ and $12_2$ of the fiber ribbons $10_1$ and $10_2$ are fusion-spliced to each other.

In the fusion-splicing device, the direction in which misalignment of the fibers may occur corresponds to or coincides with the direction (the H-direction) in which direction the resolution of the image sensor is higher than that in the other direction (the V-direction). Thus, the resolution of the image of the fibers remains high.

Moreover, the length in the H-direction of the image sensor is greater than that in the V-direction. Accordingly, even when the image of the joining portions of fibers of optical fiber ribbons having an increased number of fibers are taken by a TV camera, the entire joining portions can be covered with a high power factor. Hence, the resolution of the image of the fibers will remain high.

Figure 8:
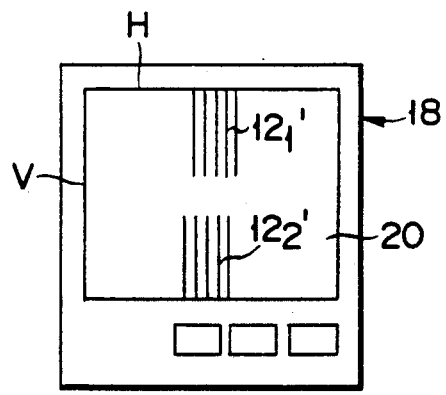
FIG. 8 is a view showing a video image of the fibers of the optical fiber ribbons displayed on the screen of TV monitor illustrated in FIG. 3.

According to the above embodiment, the fibers are displayed in the vertical direction on the monitor screen 20 of the TV monitor 18, as shown in FIG. 8. The direction in which the image is displayed is perpendicular to the direction in which the fibers are actually disposed on the fusion-splicing device, which involves the operator in the working with a little difficulty and decreases the working efficiency.

Figure 9:
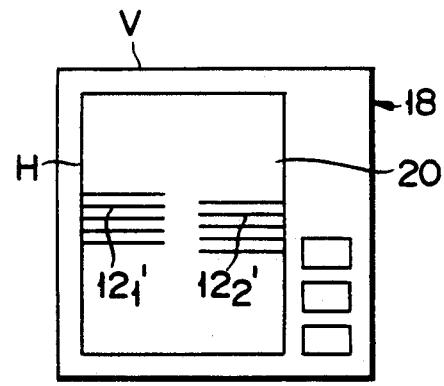
FIG. 9 is a view showing a video image of the fibers of the optical fiber ribbons displayed on the TV monitor screen when it is turned 90°.

To overcome the difficulty, the TV monitor 18 is turned 90°. Then, as shown in FIG. 9, the fiber image is displayed in the horizontal direction on the TV screen which corresponds to the coaxial direction of the fibers in which the fibers are actually disposed on the grooved members, whereby the operator can monitor with ease and his working efficiency will be increased.

Figure 10:
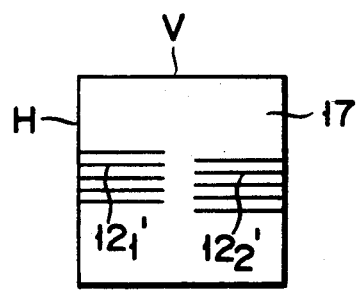
FIG. 10 is a view showing an image of the fibers of the optical fiber ribbons formed in an image sensor of square shape.

Also when an image sensor is used which has a square shape as shown in FIG. 10, if the monitor is disposed in the ordinary mode, the image is displayed in the vertical direction, as shown in FIG. 10. Then, when the TV monitor 20 is turned 90° as shown in FIG. 9, the fiber image is displayed in the horizontal direction and the working efficiency will remain high.

As set forth above, in the optical fiber ribbon fusion-splicing device according to the present invention, the TV camera 16 is set such that the horizontal direction (H-direction in FIGS. 3 and 4) of the image sensor 17 contained in the TV camera in which direction a horizontal scanning is carried out and the resolution of the image sensor is higher than that in the vertical direction (V-direction in FIGS. 3 and 4) in which a vertical scanning is carried out is direction (Y-direction in FIGS. 3 and 4) perpendicular to the coaxial direction (X-direction in FIGS. 3 and 4) of the pair of grooved supporting members 111 and 112 for supporting fibers $12_1$ and $12_2$ of a pair of optical fiber ribbons $10_1$ and $10_2$ to be fusion-spliced. Therefore, when the fibers of the pair of optical fiber ribbons are set on the supporting members in the coaxial direction thereof, the horizontal direction of the image sensor is perpendicular to the coaxial direction of the fibers of the optical fiber ribbon. Since, therefore, misalignment of the fibers is involved in the high resolution direction, the misalignment can be detected with high precision, without increasing the power factor of the image sensor. Furthermore even when the optical fiber ribbons have an increased number of fibers, an image of the entire of the joining portions can be provided in a single frame. As the result, the detection of misalignment of the fibers will be executed with ease.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical fiber ribbon fusion-splicing device comprising:

a pair of supporting members having grooves extending in a direction for supporting therein optical fibers of a pair of optical fiber ribbons to be fusion spliced, the supporting members being arranged such that the grooves of one of said pair of supporting members are aligned in a direction with the grooves of the other of said pair of supporting members;

an image sensor on which an image of said fibers of said optical fiber ribbons supported by said supporting means is formed;

a monitor having a monitoring screen for displaying thereon said image formed on said image sensor; and a pair of arc discharge electrodes for generating an arc to fusion-splice said optical fiber ribbons;

wherein said image sensor is arranged with respect to said direction in which said grooves of the pair of supporting members are aligned such that a first direction of said image sensor, in which first direction a resolution of said image sensor is higher than that in another direction, is perpendicular to said direction in which said grooves of the pair of supporting members are aligned.

2. An optical fiber ribbon fusion-splicing device according to claim 1, wherein said image sensor is included in a TV camera which is arranged such that said first direction of said image sensor is perpendicular to said direction in which said grooves of the pair of supporting members are aligned.

3. An optical fiber ribbon fusion-splicing device according to claim 1, wherein said image sensor includes an image sensing plane of rectangular shape having a first side of a first length and a second side of a second length longer than said first length, and said first-direction of said image sensor is a direction in which said second side of said image sensing plane extends.

4. An optical fiber ribbon fusion-splicing device according to claim 1, wherein said image is displayed on said monitoring screen in such a manner that the image is in a horizontal direction of said monitoring screen, said horizontal direction corresponding to said direction in which said grooves of the pair of supporting members are aligned.

* * * * *